United States Patent
Perez (10) Patent No.: US 11,526,678 B2
(45) Date of Patent: Dec. 13, 2022

(54) ATTENTION OVER COMMON-SENSE NETWORK FOR NATURAL LANGUAGE INFERENCE

(71) Applicant: NAVER CORPORATION, Gyeonggi-do (KR)

(72) Inventor: Julien Perez, Grenoble (FR)

(73) Assignee: NAVER CORPORATION, Gyeonggi-do (KR)

(*) Notice: Subject to any disclaimer, the term of this patent is extended or adjusted under 35 U.S.C. 154(b) by 399 days.

(21) Appl. No.: 16/874,081

(22) Filed: May 14, 2020

(65) Prior Publication Data

US 2021/0357595 A1  Nov. 18, 2021

(51) Int. Cl.
| | |
|---|---|
| *G06F 40/40* | (2020.01) |
| *G06F 16/23* | (2019.01) |
| *G09B 7/02* | (2006.01) |
| *G06N 20/00* | (2019.01) |
| *G06N 5/04* | (2006.01) |
| *G06F 16/33* | (2019.01) |
| *G06F 40/20* | (2020.01) |

(52) U.S. Cl.
CPC .......... *G06F 40/40* (2020.01); *G06F 16/2365* (2019.01); *G06F 16/3344* (2019.01); *G06F 40/20* (2020.01); *G06N 5/04* (2013.01); *G06N 20/00* (2019.01); *G09B 7/02* (2013.01)

(58) Field of Classification Search
CPC ...... G06F 40/40; G06F 16/3344; G06F 40/20; G06N 20/20; G06N 5/04; G09B 7/02
USPC .......................................................... 704/9
See application file for complete search history.

(56) References Cited

U.S. PATENT DOCUMENTS

| | | | | |
|---|---|---|---|---|
| 10,761,866 | B2* | 9/2020 | Liu | G06K 9/6269 |
| 10,978,056 | B1* | 4/2021 | Challa | G06F 16/3344 |
| 11,308,169 | B1* | 4/2022 | Koukoumidis | G06F 16/9532 |
| 2015/0293904 | A1* | 10/2015 | Roberts | G10L 15/1815 704/9 |
| 2017/0092273 | A1* | 3/2017 | Roberts | G06N 5/02 |
| 2017/0124432 | A1* | 5/2017 | Chen | G06T 1/60 |
| 2019/0073353 | A1* | 3/2019 | Yu | G06V 10/82 |
| 2019/0324553 | A1* | 10/2019 | Liu | H04L 51/02 |

(Continued)

OTHER PUBLICATIONS

Andreas Hanselowski, Hao Zhang, Zile Li, Daniil Sorokin, Benjamin Schiller, Claudia Schulz, and Iryna Gurevych. Ukp-athene: Multi-sentence textual entailment for claim verification. ArXiv, abs/1809.01479v5, 2019.

(Continued)

*Primary Examiner* — William D Titcomb
(74) *Attorney, Agent, or Firm* — Harness, Dickey & Pierce, P.L.C.

(57) ABSTRACT

A training system includes: a first training dataset including first entries, wherein each of the first entries includes: a first sentence; a second sentence; and an indicator of a relationship between the first and second sentences; a training module configured to: generate a second dataset including second entries based on the first entries, respectively, wherein each of the second entries includes: the first sentence of one of the first entries; the second sentence of the one of the first entries; a first surface realization corresponding to first facts regarding the first sentence; the indicator of the one of the first entries; and train a model using the second dataset and store the model in memory.

21 Claims, 6 Drawing Sheets

(56) References Cited

U.S. PATENT DOCUMENTS

| | | | | |
|---|---|---|---|---|
| 2019/0325084 | A1* | 10/2019 | Peng | G06F 16/3329 |
| 2020/0026760 | A1* | 1/2020 | Chiu | G06F 40/40 |
| 2020/0134449 | A1* | 4/2020 | Perez | G06N 3/084 |
| 2021/0312628 | A1* | 10/2021 | Larlus-Larrondo | G06N 3/084 |

OTHER PUBLICATIONS

Ankur P. Parikh, Oscar Tackstrom, Dipanjan Das, and Jakob Uszkoreit. A decomposable attention model for natural language inference. In EMNLP, 2016.

Ankur Parikh, Oscar Täckström, Dipanjan Das, and Jakob Uszkoreit. A decomposable attention model for natural language inference. In Proceedings of the 2016 Conference on Empirical Methods in Natural Language Processing, pp. 2249-2255, Austin, Texas, Nov. 2016. Association for Computational Linguistics.

Antoine Bordes, Sumit Chopra, and JasonWeston. Question answering with subgraph embeddings. In EMNLP, 2014.

Ashish Vaswani, Noam Shazeer, Niki Parmar, Jakob Uszkoreit, Llion Jones, Aidan N. Gomez, Lukasz Kaiser, and Illia Polosukhin. Attention is all you need. In NIPS, 2017.

Bauer et al., Commonsense for Generative Multi-Hop Question Answering Tasks, EMNLP 2018 (https://aclweb.org/anthology/D18-1454.pdf).

Bing Liu, Gökhan Tür, Dilek Z. Hakkani-Tür, Pararth Shah, and Larry P. Heck. Dialogue learning with human teaching and feedback in end-to-end trainable taskoriented dialogue systems. In NAACL-HLT, 2018.

Natalia Iakhina, et al., "Attention over Common-Sense Network for Natural Language Inference;" 33rd Conference on Neural Information Processing Systems (NeurIPS 2019), Vancouver, Canada.

Chaoqun Duan, Lei Cui, Xinchi Chen, Furu Wei, Conghui Zhu, and Tiejun Zhao. Attention-fused deep matching network for natural language inference. In IJCAI, 2018.

Chisholm et al., Learning to generate one-sentence biographies from Wikidata (https://arxiv.org/pdf/1702.06235.pdf).

Christopher Malon. Team papelo: Transformer networks at fever. ArXiv, abs/1901.02534, 2018.

Diederik P. Kingma and Jimmy Ba. Adam: A method for stochastic optimization, the 3rd International Conference for Learning Representations, San Diego, 2015., 2014.

Dirk Weissenborn, Tom'avs Kovcisk'y, and Chris Dyer. Dynamic integration of background knowledge in neural nlu systems. 2018.

Emma Strubell, Ananya Ganesh, and Andrew McCallum. Energy and policy considerations for deep learning in nlp. In ACL, 2019.

Erik Cambria, Björn W. Schuller, Yunqing Xia, and Catherine Havasi. New avenues in opinion mining and sentiment analysis. IEEE Intelligent Systems, 28:15-21, 2013.

Hao Zhou, Tom Young, Minlie Huang, Haizhou Zhao, Jingfang Xu, and Xiaoyan Zhu. Commonsense knowledge aware conversation generation with graph attention. In IJCAI, 2018.

Hugo Liu and Push Singh. Conceptnet-a practical commonsense reasoning tool-kit. BT Technology Journal, 22:211-226, 2004.

Jacob Devlin, Ming-Wei Chang, Kenton Lee, and Kristina Toutanova. Bert: Pretraining of deep bidirectional transformers for language understanding. In NAACLHLT, 2019.

James Thorne, Andreas Vlachos, Christos Christodoulopoulos, and Arpit Mittal. Fever: a large-scale dataset for fact extraction and verification. In NAACL-HLT, 2018.

Jeffrey Pennington, Richard Socher, and Christopher D. Manning. Glove: Global vectors for word representation. In EMNLP, 2014.

Kai Shu, Deepak Mahudeswaran, Suhang Wang, Dongwon Lee, and Huan Liu.Fakenewsnet: A data repository with news content, social context and dynamic information for studying fake news on social media. ArXiv, abs/1809.01286, 2018.

Kelvin Xu, Jimmy Ba, Ryan Kiros, Kyunghyun Cho, Aaron C. Courville, Ruslan Salakhutdinov, Richard S. Zemel, and Yoshua Bengio. Show, attend and tell: Neural image caption generation with visual attention. In ICML, 2016.

Kyunghyun Cho, Bart van Merrienboer, çaglar Gülçhre, Fethi Bougares, Holger Schwenk, and Yoshua Bengio. Learning phrase representations using rnn encoderdecoder for statistical machine translation. ArXiv, abs/1406.1078, 2014.

Lebret et al., Neural Text Generation from Structured Data with Applicaiton to the Biography Domain (https://arxiv.org/pdf/1603.07771.pdf).

Lili Mou, Rui Men, Ge Li, Yan Xu, Lu Zhang, Rui Yan, and Zhi Jin. Natural language inference by tree-based convolution and heuristic matching. In ACL, 2015.

Minjoon Seo, Aniruddha Kembhavi, Ali Farhadi, and Hannaneh Hajishirzi. Bidirectional attention flow for machine comprehension. ArXiv, abs/1611.01603v6, 2018.

Pararth Shah, Dilek Z. Hakkani-Tür, Bing Liu, and Gökhan Tür. Bootstrapping a neural conversational agent with dialogue self-play, crowdsourcing and on-line reinforcement learning. In NAACL-HLT, 2018.

Push Singh, Thomas Lin, Erik T. Mueller, Grace Lim, Travell Perkins, and Wan Li Zhu. Open mind common sense: Knowledge acquisition from the general public. In CoopIS/DOA/ODBASE, 2002.

Qian Chen, Xiao-Dan Zhu, Zhen-Hua Ling, Diana Inkpen, and Si Wei. Neural natural language inference models enhanced with external knowledge. In ACL, 2017.

Robyn Speer, Joshua Chin, and Catherine Havasi. Conceptnet 5.5: An open multilingual graph of general knowledge. In AAAI, 2018.

Samuel R Bowman, Gabor Angeli, Christopher Potts, and Christopher D Manning. A large annotated corpus for learning natural language inference. arXiv preprint arXiv:1508.05326, 2015.

Samuel R. Bowman, Jon Gauthier, Abhinav Rastogi, Raghav Gupta, Christopher D. Manning, and Christopher Potts. A fast unified model for parsing and sentence understanding. ArXiv, abs/1603.06021, 2016.

Shuohang Wang and Jing Jiang. Learning natural language inference with lstm. In HLT-NAACL, 2015.

Sizhen Li, Shuai Zhao, Bo Cheng, and Hao Yang. An end-to-end multi-task learning model for fact checking. 2018.

Soujanya Poria, Erik Cambria, and Alexander F. Gelbukh. Aspect extraction for opinion mining with a deep convolutional neural network. Knowl.-Based Syst., 108:42-49, 2016.

Takuma Yoneda, Jeff Mitchell, Johannes Welbl, Pontus Stenetorp, and Sebastian Riedel. Ucl machine reading group: Four factor framework for fact finding (hexaf). 2018.

Todor Mihaylov and Anette Frank. Knowledgeable reader: Enhancing cloze-style reading comprehension with external commonsense knowledge. In ACL, 2018.

Tsendsuren Munkhdalai and Hong Yu. Neural tree indexers for text understanding. Proceedings of the conference. Association for Computational Linguistics. Meeting, 1:11-21, 2017.

Yichen Gong and Samuel R. Bowman. Ruminating reader: Reasoning with gated multi-hop attention. In QA@ACL, 2017.

Yixin Nie, Haonan Chen, and Mohit Bansal. Combining fact extraction and verification with neural semantic matching networks. In AAAI, 2018.

* cited by examiner

ATTENTION OVER COMMON-SENSE NETWORK FOR NATURAL LANGUAGE INFERENCE

FIELD

The present disclosure relates to natural language inference and more particularly to systems and methods for training a model, such as a natural language inference model for fact checking.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Use of computers, smartphones, and other Internet-connected devices has grown exponentially. Users utilize Internet-connected devices for many different tasks. For example, a user may utilize an Internet-connected device to search for local businesses, such as restaurants. As another example, a user may utilize an Internet-connected device to obtain directions to navigate to a desired location. As yet another example, a user may utilize an Internet-connected device to perform one or more building related functions, such as turn on a light within a building, adjust heating or cooling of a building, or open or close a garage door. As yet another example, a user may utilize an Internet-connected device to search for information on a topic, place an order, etc.

SUMMARY

In a feature, a training system includes: a first training dataset including first entries, wherein each of the first entries includes: a first sentence; a second sentence; and an indicator of a relationship between the first and second sentences; a training module configured to: generate a second dataset including second entries based on the first entries, respectively, wherein each of the second entries includes: the first sentence of one of the first entries; the second sentence of the one of the first entries; a first surface realization corresponding to first facts regarding the first sentence; the indicator of the one of the first entries; and train a model using the second dataset and store the model in memory.

In further features, each of the second entries further includes a second surface realization corresponding to second facts regarding the second sentence.

In further features, each of the second entries further includes a third surface realization corresponding to third facts for both of the first and second sentences.

In further features, the training module is configured to generate at least one of the first, second, and third surface realizations using a concept retrieval algorithm.

In further features, the concept retrieval algorithm includes version 5.5 of the ConceptNet algorithm.

In further features, the training module is configured to generate the first, second, and third surface realizations using a ConceptNet algorithm.

In further features, the training module is configured to generate at least one of the first, second, and third surface realizations using a surfaceText algorithm of a ConceptNet algorithm.

In further features, the training module is configured to: extract first nouns and first adjectives in the first sentence; determine the first surface realization based on the first nouns and the first adjectives; extract second nouns and second adjectives in the second sentence; and determine the second surface realization based on the second nouns and the second adjectives.

In further features, the training module is configured to: extract only the first nouns and the first adjectives from the first sentence; and extract only the second nouns and the second adjectives from the second sentence.

In further features, the training module is configured to: set the first surface realization based on up to a predetermined number of surface realizations that are most closely associated with the first nouns and adjectives; and set the second surface realization based on up to the predetermined number of surface realizations that are most closely associated with the second nouns and adjectives.

In further features, the indicator is set to a group consisting of: a first state indicative of the first sentence being true given the second sentence; a second state indicative of the first sentence being false given the second sentence; and a third state indicative of the first and second sentences being unrelated.

A system includes: the training system; and a fact checking module configured to: receive a third sentence; determine a fourth sentence from a data source based on the third sentence; determine a fourth surface realization associated with the third sentence; determine a fifth surface realization associated with the fourth sentence; and using the model, based on the third sentence, the fourth surface realization, the fourth sentence, and the fifth surface realization, set an indicator to one of a group consisting of: a first state indicative of the third sentence being true given the fourth sentence; a second state indicative of the third sentence being false given the fourth sentence; and a third state indicative of the third and fourth sentences being unrelated.

In further features, the fact checking module is configured to: receive the third sentence from a computing device via a network; and transmit the indicator to the computing device via the network.

In further features, the model includes: a first encoder module configured to encode the third sentence; a second encoder module configured to encode the fourth surface realization; a third encoder module configured to encode the fourth sentence; a fourth encoder module configured to encode the fifth surface realization; first, second, third, and fourth context modules configured to contextualize outputs of the first, second, third, and fourth encoder modules, respectively; a first concatenation module configured to concatenate outputs of the first and second context modules; a second concatenation module configured to concatenate outputs of the third and fourth context modules; a first maxpool module configured to perform a maxpool operation on an output of the first concatenation module; a second maxpool module configured to perform a maxpool operation on an output of the second concatenation module; a third concatenation module configured to concatenate outputs of the first and second maxpool modules; a linearization module configured to linearize an output of the third concatenation module; and an output module configured to set the indicator based on an output of the linearization module.

In further features, the first training dataset includes the Stanford Natural Language Inference (SNLI) dataset.

In a feature, a fact checking system includes: a parsing module configured to parse a first sentence to be checked for factual accuracy from a query received from a computing device via a network; an answer module configured to: select a second sentence from a data source based on the first sentence; determine a first surface realization corresponding to first facts associated with the first sentence; determine a second surface realization corresponding to second facts associated with the second sentence; using a trained model, based on the first sentence, the first surface realization, the second sentence, and the second surface realization, set an indicator to one of a group consisting of: a first state indicative of the first sentence being true given the second sentence; a second state indicative of the first sentence being false given the second sentence; and a third state indicative of the first and second sentences being unrelated; and transmit the indicator to the computing device via the network.

In further features, the answer module is configured to determine the first and second surface realizations using a ConceptNet algorithm.

In further features, the answer module is configured to determine the first and second surface realizations using a surfaceText algorithm of a ConceptNet algorithm.

In further features, the trained model includes: a first encoder module configured to encode the first sentence; a second encoder module configured to encode the first surface representation; a third encoder module configured to encode the second sentence; a fourth encoder module configured to encode the second surface representation; first, second, third, and fourth context modules configured to contextualize outputs of the first, second, third, and fourth encoder modules, respectively; a first concatenation module configured to concatenate outputs of the first and second context modules; a second concatenation module configured to concatenate outputs of the third and fourth context modules; a first maxpool module configured to perform a maxpool operation on an output of the first concatenation module; a second maxpool module configured to perform a maxpool operation on an output of the second concatenation module; a third concatenation module configured to concatenate outputs of the first and second maxpool modules; a linearization module configured to linearize an output of the third concatenation module; and an output module configured to set the indicator based on an output of the linearization module.

In a feature, a training method includes: storing a first training dataset including first entries, where each of the first entries includes: a first sentence; a second sentence; and an indicator of a relationship between the first and second sentences; generating a second dataset including second entries based on the first entries, respectively, where each of the second entries includes: the first sentence of one of the first entries; the second sentence of the one of the first entries; a first surface realization corresponding to first facts regarding the first sentence; and the indicator of the one of the first entries; training a model using the second dataset; and storing the model in memory.

In a feature, a training system includes: a first training dataset including first entries, where each of the first entries includes: a first sentence; a second sentence; and an indicator of a relationship between the first and second sentences; a means for: generating a second dataset including second entries based on the first entries, respectively, wherein each of the second entries includes: the first sentence of one of the first entries; the second sentence of the one of the first entries; a first surface realization corresponding to first facts regarding the first sentence; the indicator of the one of the first entries; and training a model using the second dataset and storing the model in memory.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Natural Language Inference (NLI) is an important and challenging task for natural language understanding. A goal of NLI may be to identify a logical relationship (e.g., true, false, or uncertain) between a premise and a corresponding hypothesis sentence. NLI may be used, for example, for fact checking, fake news detection, etc.

Deep learning NLI models may be used for fact checking and fake news detection. Such NLI models may use an attention mechanism and a pretrained language model based encoder to jointly interpret and align the premise and hypothesis.

The dependency relationships between the premise and the hypothesis may be modeled during the encoding and inference processes to prevent the network from the loss of relevant, contextual information. Constructing a representative dataset of the underlying distribution may be difficult.

An unsupervised language model may be used, but involves a costly training procedure requiring the processing of a large amount of data.

NLI can be used to detect meaningful passages in a corpus of reference for automated fact checking and fake news detection. A goal of automated fake news detection is to reduce the human time and effort to detect fake news and help to stop fake news from being disseminated.

Automated (automatic) fake news detection involves assessing the truthfulness of claims, such as claims in news. Both traditional news media and social media may have large social-political impacts on society. Detecting fake news and fact checking is therefore important to society.

A non-automated way of fake news detection involves humans (e.g., professionals in the relevant field) to check claims against evidence based on previously spoken or written facts. This, however, is tedious, time consuming, slow, and costly. For example, a service may involve three editors to judge whether a piece of news is real or fake.

The present disclosure involves training a model, for example for automated fact checking and/or fake news detection, using an augmented training dataset. A training dataset includes entries, where each of the entries includes only a premise sentence, a true hypothesis sentence (indicating that the premise sentence is true/factually correct relative to the true hypothesis sentence), a neutral hypothesis sentence (indicating that a relationship between the premise sentence and the neutral hypothesis sentence is unknown), and a contradictory hypothesis sentence (indicating that the premise sentence is false/factually incorrect relative to the false hypothesis sentence). The entries of the training dataset are augmented to produce the augmented training dataset. The entries of the augmented training dataset each include a premise sentence, a surface realization (sentence) corresponding to a set of facts related to the premise sentence, a hypothesis sentence, a surface realization (sentence) corresponding to a set of facts related to the hypothesis sentence, a surface realization (sentence) set of facts that are related to both the premise and hypothesis sentences, and an indicator (e.g., true, neutral, false) of the relationship between the premise and hypothesis sentences. Training using the augmented training dataset simplifies the training architecture. The trained model provides more accurate indicators of the truthfulness of sentences than models trained based on the (non-augmented) training dataset. Use of the augmented training dataset may also allow training to be completed more quickly than training using the training dataset and one or more other types of training.

Figure 1:
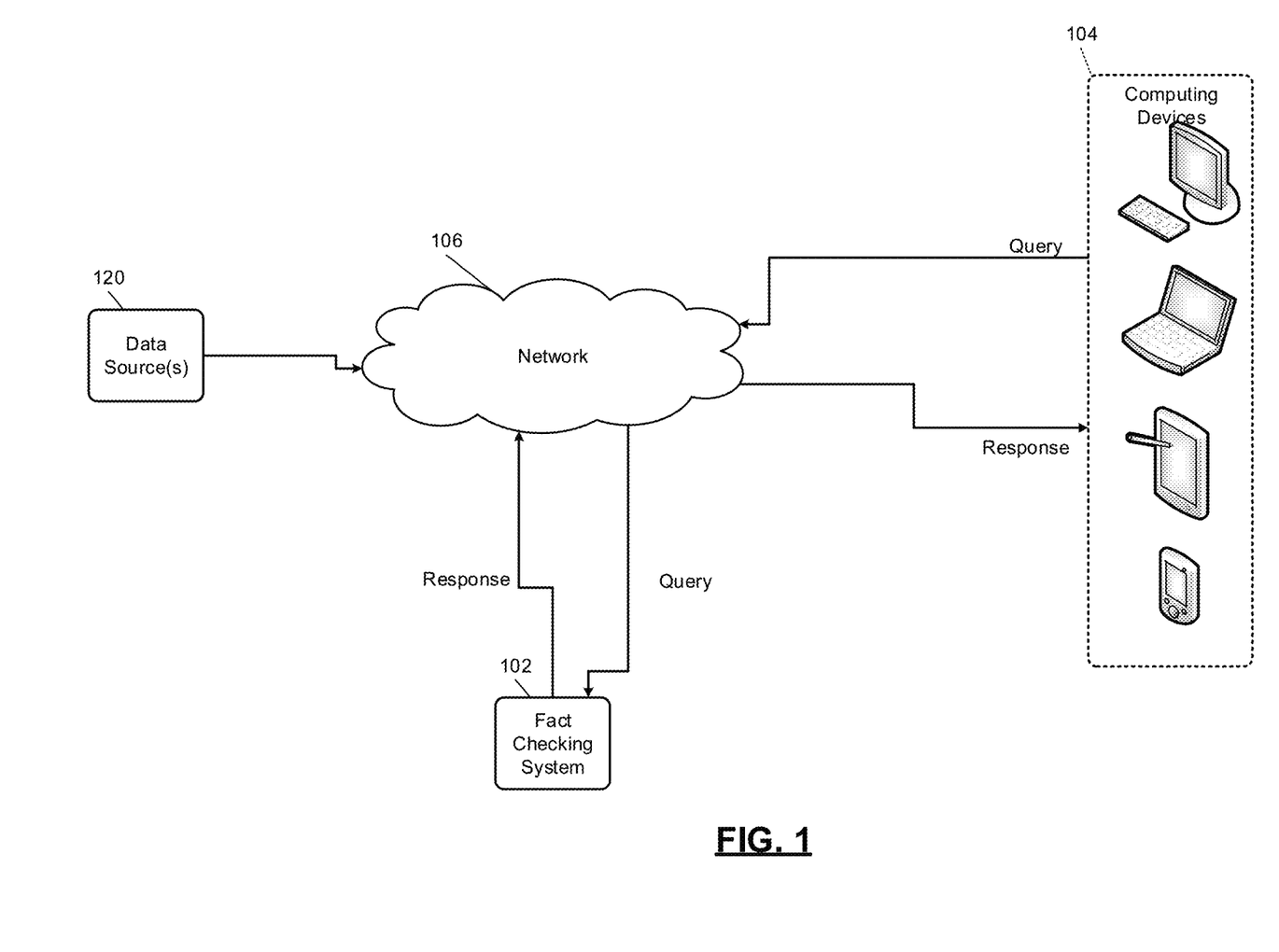
FIG. 1 includes a functional block diagram of an example environment including a fact checking system configured to indicate entailment regarding sentences to be fact checked for factual accuracy.

FIG. 1 includes a functional block diagram including a fact checking system 102 configured to respond to queries. The fact checking system 102 is configured to receive queries from one or more user computing device(s) 104 via a network 106. Each query includes a sentence to be checked for factual accuracy.

The fact checking system 102 determines whether the sentence of each query is true, false, or whether factual accuracy is uncertain. The fact checking system 102 transmits responses including the determination regarding the sentences accuracy back to the computing devices 104 that transmitted the queries, respectively. Thus, the answer regarding factual accuracy of a sentence received from a computing device is transmitted back to that computing device.

The computing devices 104 may output the answers regarding the queries. For example, a computing device may visually output an answer by displaying the answer on a display. Additionally or alternatively, a computing device may audibly output an answer via one or more speakers. The computing devices 104 may also output other information to the users. For example, the computing devices 104 may output additional information related to the queries, respectively, information relevant to the answers, respectively, etc. The fact checking system 102 and the computing devices 104 communicate via a network 106.

A plurality of different types of computing devices 104 are illustrated in FIG. 1. The computing devices 104 include any type of computing devices that is configured to generate and transmit queries to the fact checking system 102 via the network 106. Examples of the computing devices 104 include, but are not limited to, smart (cellular) phones, tablet computers, laptop computers, and desktop computers, as illustrated in FIG. 1. The computing devices 104 may also include other computing devices having other form factors, such as computing devices included in vehicles, gaming devices, televisions, consoles (e.g., smart speakers without displays Amazon Echo, Google Home, Clova Friends mini) or other appliances (e.g., networked refrigerators, networked thermostats, etc.).

The computing devices 104 may use one or more different operating systems. In an example where a computing device 104 is a mobile device, the computing device 104 may run an operating system including, but not limited to, Android, iOS developed by Apple Inc., or Windows Phone developed by Microsoft Corporation. In an example where a computing device 104 is a laptop or desktop device, the computing device 104 may run an operating system including, but not limited to, Microsoft Windows, Mac OS, or Linux. The computing devices 104 may also access the fact checking system 102 while running operating systems other than those operating systems described above, whether presently available or developed in the future.

In some examples, a computing device 104 may communicate with the fact checking system 102 using an application installed on the computing device 104. In general, a computing device 104 may communicate with the fact checking system 102 using any application that can transmit queries to the fact checking system 102 to be answered by the fact checking system 102. In some examples, a computing device 104 may run an application that is dedicated to interfacing with the fact checking system 102, such as an application dedicated to fact checking. In some examples, a computing device 104 may communicate with the fact checking system 102 using a general application, such as a web-browser application.

The application executed by a computing device 104 to communicate with the fact checking system 102 may display a search field on a graphical user interface (GUI) in which the user may enter queries. The user may input a query to a computing device, for example, using a touchscreen or physical keyboard, a speech-to-text program, or other form of user input.

A query entered into a GUI on a computing device 104 may include words, numbers, letters, punctuation marks, and/or symbols. In general, a query may be a request for a determination (e.g., an answer) from the fact checking system 102 regarding factual accuracy of a sentence included in the query.

A computing device 104 may receive a response including an answer from the fact checking system 102 that is responsive to the query transmitted to the fact checking system 102. In various implementations, the computing device 104 may receive and the fact checking system 102 may transmit more than one answer that is responsive to the query. In the example of the fact checking system 102 providing multiple answers, the fact checking system 102 may determine a confidence value (indicative of a likelihood of that answer being correct) for each of the individual answers and provide the confidence values along with the answers to the computing device 104. The computing device 104 may output more than one of the multiple answers (e.g., all answers having a confidence value that is greater than a predetermined value), only the answer with the highest confidence value, etc.

The computing device 104 may be executing an application including a GUI that displays the answer(s) received from the fact checking system 102. The respective confidence value(s) may also be displayed in the example of multiple answers. An information source relied upon to generate an answer may also be output with the answer. For example, the application used to transmit the query to the fact checking system 102 may also present (e.g., display or speak) the received answer(s) to the user.

The GUI of the application running on the computing device 104 may output the answer(s) to a user in a variety of different ways, such as depending on what information is transmitted to the computing device 104. In examples where the search results include a list of answers and associated confidence values, the fact checking system 102 may transmit the list of answers and respective confidence values to the computing device 104. In this example, the GUI may display the answer(s) and the confidence value(s) to the user as a list of possible answers.

In some examples, the fact checking system 102, or another computing system, may transmit additional information to the computing device 104 such as, but not limited to, applications and/or other information associated with the query (e.g. the subject of the query). The additional information may be stored in a data store and transmitted by the fact checking system 102 to the computing device 104 in some examples. In examples where the computing device 104 receives the additional information, the GUI may display the additional information along with the answer(s). In some examples, the GUI may display the answers as a list ordered from the top of the screen to the bottom of the screen by descending confidence value. In some examples, the answers may be displayed under the search field in which the user entered the query.

In some examples, computing devices 104 may communicate with the fact checking system 102 via another computing system. The other computing system may include a computing system of a third party that may leverage the functionality of the fact checking system 102. The other computing system may belong to a company or organization other than that which operates the fact checking system 102. Example third parties which may leverage the functionality of the fact checking system 102 may include, but are not limited to, internet search providers and wireless communications service providers. The computing devices 104 may send queries to the fact checking system 102 via the other computing system. The computing devices 104 may also receive responses from the fact checking system 102 via the other computing system.

The fact checking system 102 determines the answers to sentences to be fact checked using information from one or more data sources 120. The data sources 120 may include digital distribution platforms such as, but are not limited to, online news sources, websites, websites that include web logs (i.e., blogs), social networking sites (e.g., Facebook, Twitter, etc.), and/or other types of data sources. For example, the fact checking system 102 may determine one or more sentences from one or more of the data sources 120 that are most relevant to the factual accuracy of the sentence of a query to be fact checked. The fact checking system 102 determines the answer using the sentence of the query and the one or more sentences from the one or more data sources 120 using a model. The model is trained using an augmented dataset, as discussed further below.

The computing devices 104, the fact checking system 102, and the data sources 120 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

Figure 2:
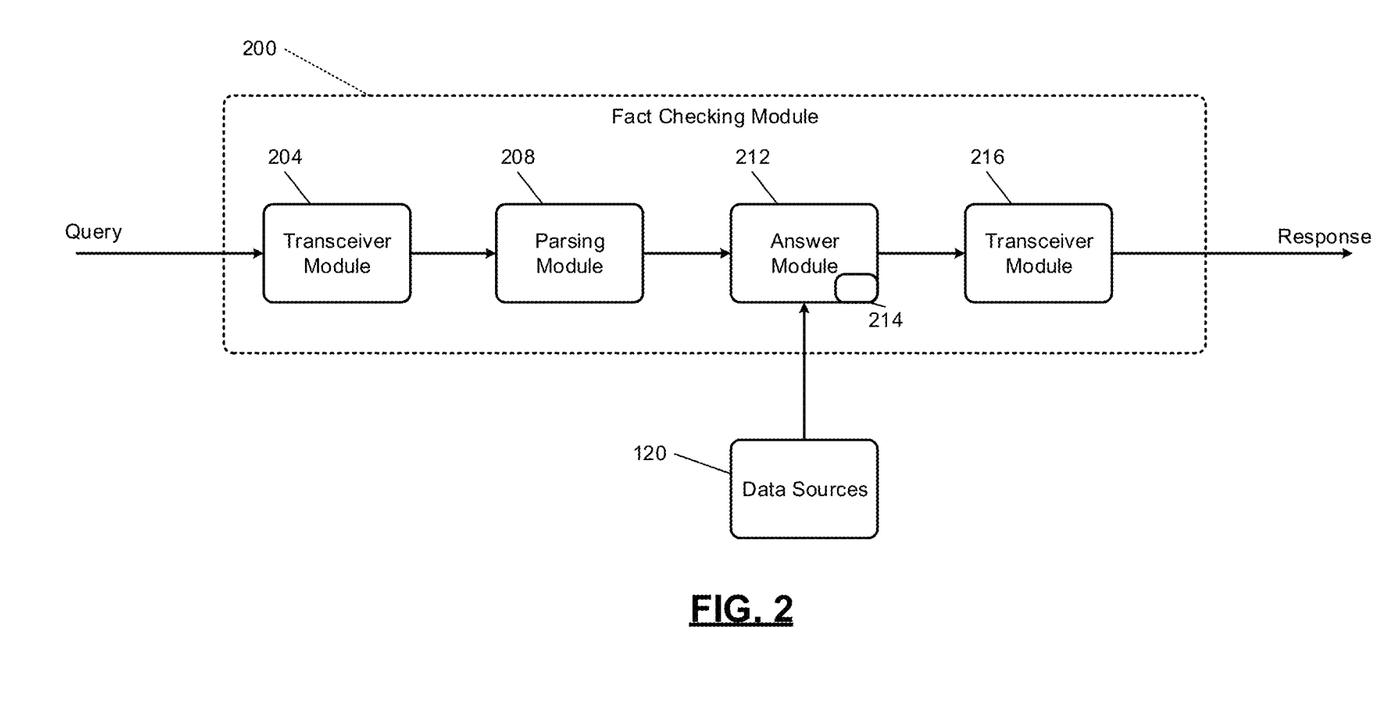
FIG. 2 includes a functional block diagram including an example implementation of a fact checking module.

FIG. 2 is a functional block diagram including an example implementation of a fact checking module 200 of the fact checking system 102. A first transceiver module 204 receives a query including a sentence to be checked for factual accuracy from a computing device 104.

A parsing module 208 parses the query to obtain the sentence that is to be fact checked. The parsing module 208 may, for example, identify a string of one or more words forming the sentence. The parsing module 208 may also correct any misspelled words in the sentence and/or perform one or more other word processing functions on the sentence. The parsing module 208 may also determine a premise of the sentence and one or more facts included in the sentence regarding the premise.

An answer module 212 determines N sentences in one or more of the data sources 120 that are most relevant to the sentence that is to be fact checked. N is an integer greater than or equal to 1. The answer module 212 may determine the N sentences, for example, using a sentence matching algorithm or in another suitable manner. Fuzzywuzzy is one example of a sentence matching algorithm, which uses Levenshtein Distance to calculate the differences between sequences. The N sentences are referred to as N hypotheses, respectively.

The answer module 212 determines the answer based on the sentence to be fact checked and the N hypotheses using a trained model 214. Specifically, the answer module 212 inputs the sentence to be fact checked (a vector representation of the sentence) and one of the N hypotheses (a vector representation of that one sentence) to the trained model 214. The answer module 212 also inputs a surface representation of facts (a vector representation of a surface realization sentence corresponding to facts) for the sentence to be fact checked and a surface realization (a vector representation of a surface realization sentence corresponding to facts) for the one of the N hypotheses to the trained model 214. The answer module 212 may determine the surface realizations, for example, using the ConceptNet algorithm, as discussed further below. The answer module 212 may input the sentences, for example, after applying the surfaceText component, as discussed further below.

The trained model 214 outputs an indicator of whether the sentence to be fact checked is true, false, or unknown (neutral) given the one of the N hypotheses. In the example of N being equal to 1, the output of the trained model 214 indicates whether the sentence to fact checked is true, false, or uncertain given the one hypothesis. The output of the trained model 214 is the answer regarding the truthfulness of the sentence to be fact checked.

In the example of N being greater than 1, the answer module 212 inputs each of the N hypotheses with the sentence to be fact checked to the trained model 214. This results in the trained model 214 generating N outputs, where each of the N outputs is generated based on the sentence to be fact checked and one of the N hypothesis. The answer module 212 determines the answer regarding the truthfulness of the sentence to be fact checked based on the N outputs. For example, the trained model 214 may set the output to a first value (e.g., digital 2) to indicate true, a second value (e.g., digital 1) to indicate uncertain, and to a third value (e.g., digital 0) to indicate false. The answer module 212 may determine an average of the N outputs (e.g., by summing the N outputs and dividing by N) and determine the answer based on the average. The answer module 212 may determine the answer to be uncertain when the average is within a predetermined range, determine the answer to be true/truth when the average is greater than an upper limit of the predetermined range, and determine the answer to be false when the average is less than a lower limit of the predetermined range.

The training of the trained model 214 is discussed further below.

A second transceiver module 216 transmits the determined answer regarding the sentence to be fact checked back to the computing device 104 from which the query was received. In various implementations, the second transceiver module 216 may be omitted, and the first transceiver module 204 may transmit the answer back to the computing device 104 from which the query was received.

Figure 3:
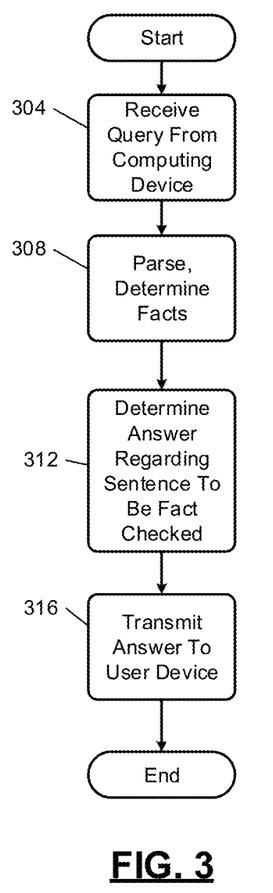
FIG. 3 includes a flowchart depicting an example method of receiving a query sentence and providing an indication of whether the sentence is true.

FIG. 3 includes a flowchart depicting an example method of receiving a query regarding a sentence to be fact checked and providing an answer regarding the sentence. The example of FIG. 3 may be performed by the fact checking module 200.

Control begins with 304 where the fact checking module 200 receives a query from a computing device 104. The query includes a sentence to be fact checked (checked for truthfulness). At 308, the fact checking module 200 parses the query and determines the sentence to be fact checked.

The fact checking module 200 determines the answer regarding the truthfulness of the sentence to be fact checked at 312 using the trained model 214. The fact checking module 200 also determines the N hypotheses at 312. At 316, the fact checking module 200 responds back to the computing device 104 with the answer regarding the truthfulness of the sentence to be fact checked.

Figure 4:
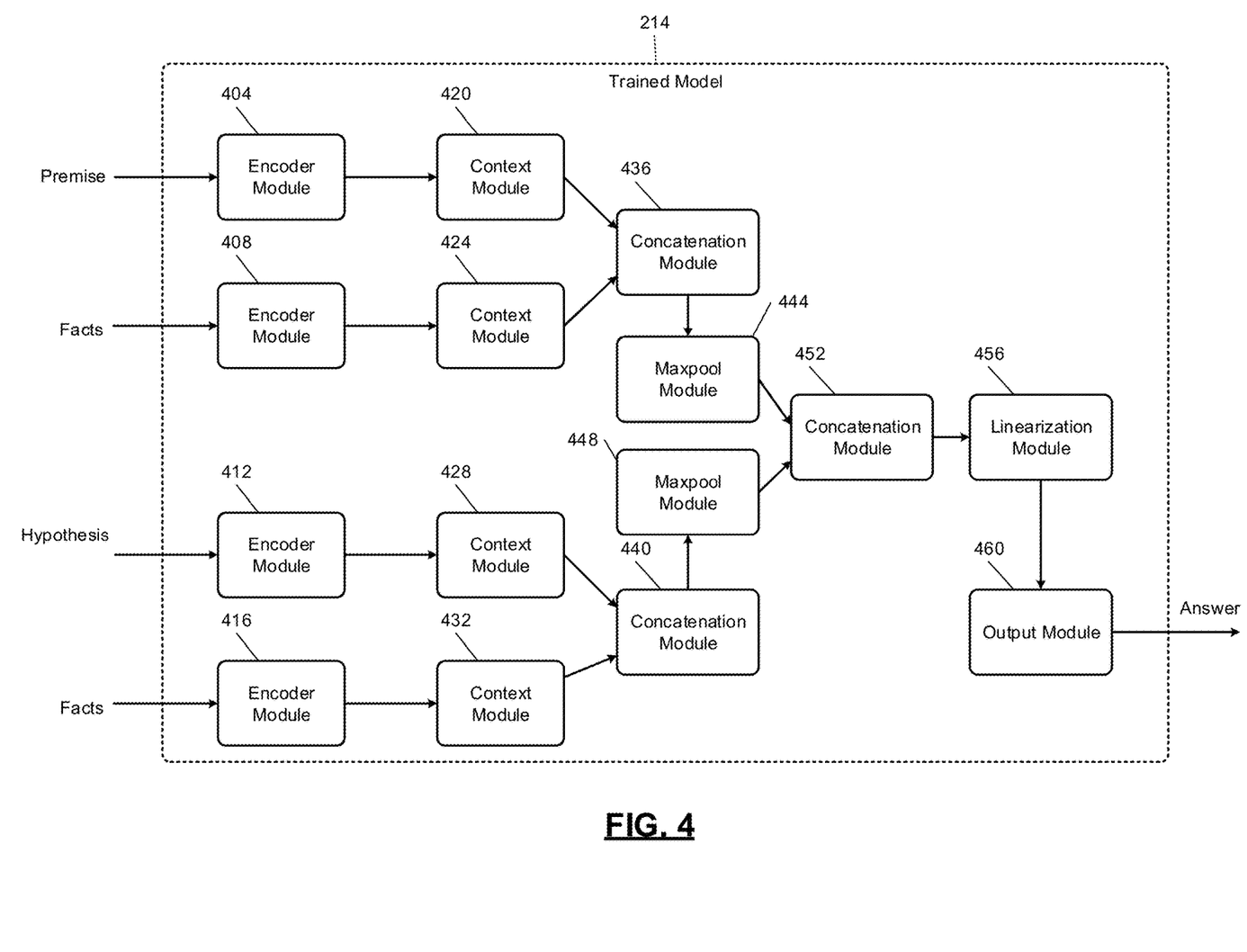
FIGS. 4 and 5 are functional block diagrams of example implementations of a model trained to indicate whether a query (premise) sentence is true.
Figure 5:
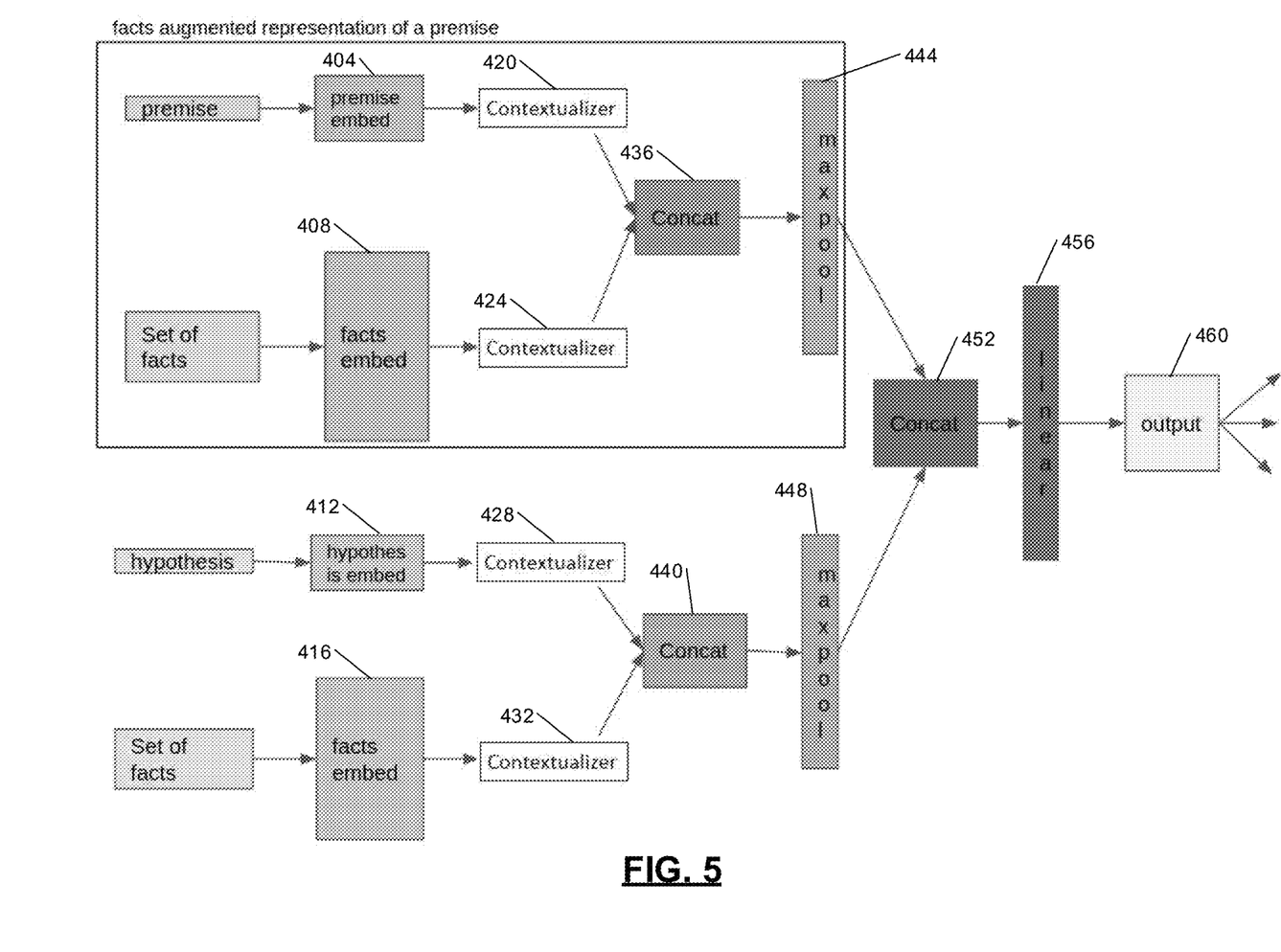

FIGS. 4 and 5 are functional block diagrams of an example implementation of the trained model 214. The trained model 214 includes encoder (embedder) modules 404, 408, 412, and 416. The encoder module 404 encodes the premise sentence to be fact checked using an encoding algorithm. The encoder module 408 encodes a surface realization of the premise sentence to be fact checked using the encoding algorithm. The encoder module 412 encodes one of the N hypotheses using the encoding algorithm. The encoder module 416 encodes a surface representation corresponding to facts of the hypothesis using the encoding algorithm. The encoding algorithm may be, for example, the bidirectional encoder representations from transformers (BERT) algorithm, the global vectors (GloVe) for word representation algorithm or another suitable encoding algorithm. The encoder modules 404-416 output vector representations of the respective inputs.

The trained model 214 also includes context (contextualizer) modules 420, 424, 428, and 432. The context module 420 contextualizes the output of the encoder module 404 using, for example, a gated recurrent unit (GRU). The GRU may be configured to perform sentence encoding, such as transforming words or sequences of words into a fixed-length vector representation of the input. The context module 424 contextualizes the output of the encoder module 408 using, for example, the GRU. The context module 428 contextualizes the output of the encoder module 412 using, for example, the GRU. The context module 432 contextualizes the output of the encoder module 416 using, for example, the GRU. In this manner, vector representations for the premise, its facts, the hypothesis, and its facts are obtained by separately applying the GRU to the outputs of the encoders 404-416.

The trained model 214 also includes concatenation modules 436 and 440. The concatenation module 436 concatenate the outputs of the context modules 420 and 424. For example, the concatenation module 436 may concatenate the last hidden states of the GRU. The concatenation may include aligning the outputs of the context modules 420 and 424 end to end to form a vector representation having the sentence dimension (1 for the premise and N for its facts). The result of the concatenation is a mixed (vector) representation of the premise and its facts as a single tensor of dimension [B*(N+1)*2H] where B is a minibatch size, N is the number of factoral sentences +1 for the premise, and H is the hidden size of the GRU. H is multiplied by 2, which is the number of directions.

The concatenation module 440 concatenate the outputs of the context modules 428 and 432. For example, the concatenation module 440 may concatenate the last hidden states of the GRU. The concatenation may include aligning the outputs of the context modules 428 and 432 end to end to form a vector representation having the sentence dimension (1 for the hypothesis and N for its facts). The result of the concatenation is a mixed (vector) representation of the hypothesis and its facts as a single tensor of dimension [B*(N+1)*2H].

The trained model 214 also includes maxpool modules (layers) 444 and 448. The maxpool module 444 has a kernel size equal to N+1 and the stride may be equal to 1. This may mean that for each hidden state of the representation, the maximum number will be taken and kept as a representer of this state in a final vector. The final vector output by the maxpool module 444 may be referred to as a facts augmented representation of the premise.

The maxpool module 448 also has a kernel size equal to N+1 and the stride may be equal to 1. This may mean that for each hidden state of the representation, the maximum number will be taken and kept as a representer of this state in a final vector. The final vector output by the maxpool module 448 may be referred to as a facts augmented representation of the hypothesis.

The trained model 214 also includes a concatenation module 452. The concatenation module 452 concatenate the outputs of the maxpool modules 444 and 448. The concatenation may include aligning the outputs of the maxpool modules 444 and 448 end to end to form a vector representation having the hidden state dimension to retail all of the information accumulated in the augmented representations.

A linearization module 456 linearizes the output of the concatenation module 452 to generate an output of dimensions [B×C] where B is the minibatch size and C is the number of possible outputs. In this example, the number of possible outputs is 3 (true, false, an uncertain), and B is equal to 1. The linearization module 456 may performing the linearization by multiplying its input by a predetermined linearization matrix. Each of the C entries corresponds to one of the possible outputs. One of the C entries may be set to a first state (e.g., 1) as a result of the linearization and each of the other ones of the C entries may be set to a second state (e.g., 0) as a result of the linearization. The one of the C entries of the output of the linearization module 456 that is in the first state therefore indicates the answer regarding whether the premise (sentence to be fact checked) is true, false, or uncertain.

An output module 460 determines the answer using the output of the linearization module 456. For example, the output module 460 may indicate that the answer is true (i.e., the sentence to be fact checked is true) when the output of the linearization module 456 is [1, 0, 0]. The output module 460 may indicate that the answer is uncertain (i.e., it is uncertain whether the sentence to be fact checked is true) when the output of the linearization module 456 is [0, 1, 0]. The output module 460 may indicate that the answer is false (i.e., the sentence to be fact checked is false) when the output of the linearization module 456 is [0, 0, 1].

Figure 6:
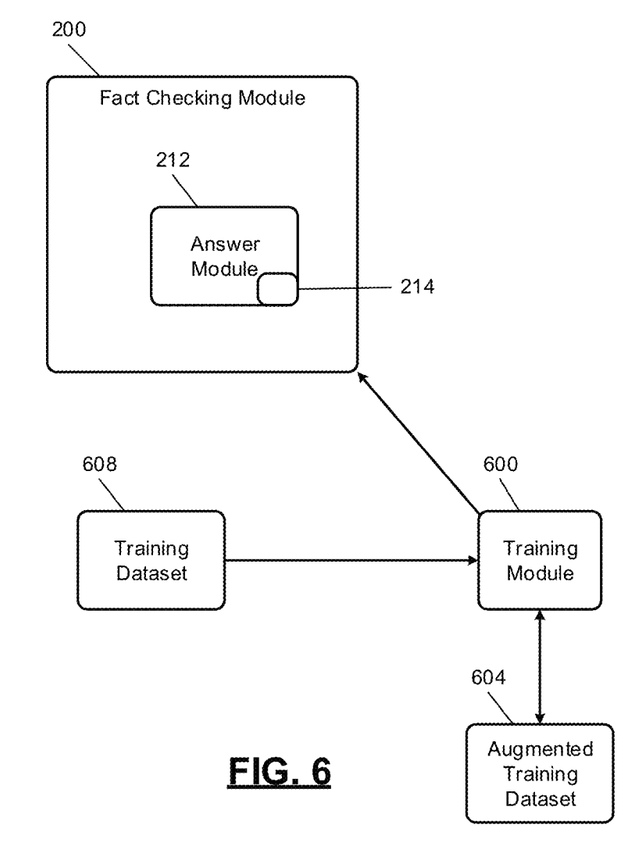
FIG. 6 includes a functional block diagram of a training system for training a model used by the fact checking module.

FIG. 6 is a functional block diagram of a training system for training the trained model 214. A training module 600 trains the trained model 214 (e.g., weight values used by the trained model 214) using an augmented training dataset 604. The training module 600 generates the augmented training dataset 604 from a (original) training dataset 608. The training dataset 608 includes entries having first data stored in a first format. The augmented training dataset 604 includes entries having second data stored in a second format. The second data is different than the first data at least in part, and the first format is different than the second format at least in part.

Formally, each example of the NLI task can be represented as a triple (P, Q, y), where $P=(p_1; \ldots; p_j; \ldots; p_M)$ is a sentence with a length M, $Q=(q_1; \ldots; q_i; \ldots; q_N)$ is a second sentence with a length N, $y \in Y$ is the label representing the relationship between P and Q, and Y is a set of task specific labels. The NLI task includes estimating a conditional probability Pr(y|P, Q) based on the training dataset 608 or the augmented training dataset 604, and predicting the relationship for testing examples by $$y^* = \mathrm{argmax}_{y \in Y}(\Pr\, y|P,Q),$$

where Pr represents a probability.

For the NLI task, P is a premise sentence, Q is a hypothesis sentence, and Y=the indicator of the truthfulness of the premises sentence (Y={true, false, uncertain}). True indicates that Q can be inferred from P, false indicates that Q cannot be a true condition on P, and uncertain means P and Q are irrelevant to each other.

The training dataset 608 may be, for example, the Stanford Natural Language Inference (SNLI) dataset or another suitable training dataset. The training dataset 608 includes a plurality of entries, where each entry includes a premise sentence, a hypothesis sentence, and a relationship (true, false, uncertain) between premise sentence and the hypothesis sentence. Thus, the training dataset 608 includes entries, where the entries include pairs of sentences and an indicator of the relationship between that pair. Table 1 below includes an example of 1 premise sentence, 3 hypothesis sentences, and the relationship between the premise sentence and the associated hypothesis sentence. In the training dataset 608, the information included in Table 1 may be provided in three entries, where each of the three entries includes: (a) the premise sentence; (b) one of the hypothesis sentences; and (c) the associated one of the indicators.

TABLE 1

Samples/entries from the training dataset.

| | | |
|---|---|---|
| P[a] | A senior is waiting at the window of a restaurant that serves sandwiches. | Relationship |
| H[b] | A person waits to be served his food. | Entailment |
| | A man is looking to order a grilled cheese sandwich. | Neutral |
| | A man is waiting in line for the bus. | Contradiction |

[a]P, Premise.
[b]H, Hypothesis.

As stated above, the training module 600 generates the augmented training dataset 604 using the training dataset 608 and trains the trained model 214 using the augmented training dataset 604.

The source of knowledge used to leverage for augmenting the pairwise sentence supervision scheme will be discussed first. Second, how to match the available knowledge with the corresponding pairs of sentences will be discussed. Two approaches based on the independent and cross-dependent lexical information of the pair of sentences are discussed below. The model used to leverage such knowledge though an attention mechanism is also discussed.

The training module 600 generates the augmented training dataset 604 using the ConceptNet algorithm, such as ConceptNet version 5.5 (described in the publication "ConceptNet 5.5: An Open Multilingual Graph of General Knowledge" available on arXiv as arXiv:1612.03975), an earlier version, or a later version, or another suitable concept retrieval algorithm. ConceptNet is a knowledge graph that connects words and phrases of natural language (terms) with labeled, weighted edges (assertions). ConceptNet provides a large knowledge graph that focuses on the common-sense meanings of words as they are used in natural language. Its focus on words makes it compatible with the idea of representing word meanings as vectors. ConceptNet version 5.5 has expanded to include lexical and world knowledge from different sources in multiple different languages. The training module 600 may use the ConceptNet algorithm in English or another suitable language.

The training module 600 may utilize the surface realization slot associated to triples. In other words, triples may be input to the ConceptNet algorithm. This information may be used instead of the triples in order to genericize for other sources of knowledge. The training module 600 may access the ConceptNet algorithm, for example, via an application programming interface (API). In various implementations, the training module 600 may execute a surfaceText component (algorithm) called by the API. The surfaceText component allows loading of linked concepts along with the type of relationships between them in a form of plain text. In other words, following the formula <concept>+<relationship>+<linked concept>, the training module 600 obtains a regular sentence (a surface representation) which then is treated as usual text and used as an input to the model. Those sentences may be referred to in the following as facts. By loading the facts in the surfaceText form, in the future, other selected text from the Internet can be loaded to gain additional knowledge from additional data sources, such as Wikipedia, one or more news sources, etc. The training could be updated without having to adapt text from the additional data sources to a specific form of knowledge representation. The training module 600 is therefore more flexible and adaptable than other approaches.

To build the augmented training dataset 604, for each sentence taken from the training dataset 608, the training module 600 extracts surface text from the ConceptNet, following the rules: (1) concepts can be only nouns or adjectives; and (2) for each concept (or pair of concepts) load up to a predetermined number (e.g., 5) top facts ordering by weight.

The training module 600 loads relations for pairs of concepts for the training. So, following the above rules, the training module 600 may load facts for concepts taken from premises and hypotheses of training dataset 608 in pairs. In the following, those pairs may be referred to as joint facts or facts pairs, which are different than facts loaded for each sentence independently.

Algorithm 1 below provides an example of a process for one pair from the training dataset 608. The following may be performed for all or a predetermined number of pairs from the training dataset 608.

---
Algorithm 1 Fact extraction procedure
---
--Obtain the premise sentence
--Create a list of all the concepts (nouns and adjectives only) containing in the premise sentence
--Load a list of facts related to those concepts as a surface text from conceptNet
--Obtain hypothesis sentence
--Create a list of all the concepts (nouns and adjectives only) containing in the hypothesis sentence
--Load facts related to those concepts as a surface text from conceptNet for (limit to predetermined number, e.g., 5) facts per concept)
--Match each concept of the premise with each concept of the hypothesis creating the word couples
--Load facts related to each pair of concepts, i.e. to both premise, and hypothesis, as a surface text from conceptNet.
Retain the original indicator (true, false, uncertain) from the training dataset 608 corresponding to the pair of sentences (premise and hypothesis)

---

The entries of the augmented training dataset 604 augmented with the ConceptNet facts have the following information and structure:

---
--premise: an original sentence from the training dataset 608
--set of facts related to the premise
--hypothesis: an original sentence from the training dataset 608
--set of facts related to the hypothesis
--set of facts related to both the premise and the hypothesis
--indicator/label from the training dataset for the premise and hypothesis (true, false, uncertain)
---

Table 2 below includes an example of one sample (entry) of the augmented training dataset 604.

TABLE 2

An example of one sample of the augmented training dataset

| | |
|---|---|
| premise (p) | Children playing checkers. |
| facts for the premise | Dames is a translation of checkers, jeu de dames is a translation of checkers, damas is a translation of checkers, dam is a translation of checkers, king is used in the context of checkers |
| hypothesis (h) | Children are playing board games. |
| facts for the hypothesis | board is related to wood, board is related to plank, board is related to flat, You can use a board to build, game is related to board, play is related to games, a marble is used for games, board is related to games, games are fun to play |
| joint facts for both p and h | board is related to checkers |
| label | entailment |

The training dataset 608 may include more entries than the augmented training dataset 604. For example, the SNLI dataset includes approximately 570,000 human-written English sentence pairs manually labeled. The augmented training dataset 604 may have less pairs/entries, but is more robust in terms of tokens obtained and vocabulary range. The augmented training dataset 604 may include over 169,000 entries. The training module 600 splits the augmented training dataset 604 into training, validation, and testing datasets at a predetermined ratio, such as 0.8 (80%), 0.2 (20%), 0.2 (20%), respectively.

Three examples are discussed below. The versions of the model called facts pairs include all the fields of the augmented training dataset 604, premise, hypothesis, facts for premise, for hypothesis, and the joint facts. This is the most reach in data setting, which is at the same time the noisiest. The models referred to as simple facts exclude the joint facts field of the augmented training dataset 604, they utilize only 2 sets of facts which are loaded independently from each other. Referent no facts models take into account only the augmented training dataset 604 without any modifications, and therefore include pairs of sentences+the label/indicator.

The training module 600 may be implemented with Pytorch framework. To train the trained model 214, the training module 600 may minimize the cross entropy of the augmented training dataset 604 and use the Adam optimizer to update parameters/values of the trained model 214. A predetermined learning rate (e.g., 0.0005) and a predetermined batch size (e.g., 128) may be used for the training. When the trained model 214 does not improve best in domain performance for 50,000 steps, the training module 600 may use a stochastic gradient descent (SGD) optimizer, for example, to assist the trained model 214 in finding a better local optimum. A predetermined learning rate (e.g., 3e-4) may be used with the SGD optimizer.

The training module 600 may include one or more dropout layers before all linear layers and after a word embedding layer. The training module 600 may initialize word embeddings with pre-trained 300D GloVe 840B vectors while out-of-vocabulary words are randomly initialized with uniform distribution. The Bert-uncase model used is pre-trained. For a dense block in a feature extraction layer, the number of layers n is set to a predetermined number (e.g., 8) and a growth rate g is set to a predetermined rate (e.g., 20). The training module 600 uses hyperparameters selected through cross-validation.

Six model variations are evaluated below to find out how many pairs of sentences were solved correctly and to scale the overall performance. Calculated was the accuracy along with the F1-measure for each model.

Table 3 shows the quantitative results of the experiments. Notice the difference in performance between the models augmented and non-augmented with facts (surface realizations corresponding to facts). These comparisons give insight on how the prior knowledge augmentation affects a model's performance and how such an approach can help with solving a task.

Training based on the augmented training dataset 604 reaches similar or better results while having a more simple architecture which may provide faster training. Training based on the augmented training dataset 604 obtained a 65.34% accuracy which outperforms training based on the training dataset 608. The models using simple facts and the joint facts pairs may not drastically differ in the performance, since the joint facts are mostly an intersection of the simple facts plus some additional minor information. Moreover, depending on the type of additional facts used, a slight performance improvement or noise may be realized.

The facts pairs model may provide best results to not only provide contextualization to each sentence but also interactions between the sentences through the augmented fact representation. The models pre-trained with BERT encodings may perform better than the models without BERT pre-training. Pretraining with BERT encodings may increase training time. Both facts augmented and non-augmented models significantly benefit from the pre-training with BERT.

TABLE 3

Summary of parameter numbers, accuracies and F1 measure for each of 6 different models: 2 models enriched with facts pairs (joint facts), 2 models enriched with independent (simple) facts, 2 models without facts. Each pair of the models includes the setting with (bottom 3) and without (top 23) BERT pre-training.

| Model | Parameters | Accuracy (%) | F1 measure (%) |
| --- | --- | --- | --- |
| no facts (no BERT) | 187.3k | 55.6 | 57.28 |
| simple facts (no BERT) | 187.5k | 65.34 | 65.28 |
| facts pairs (no BERT) | 190.6k | 72.54 | 74.31 |
| no facts + BERT | 110.5 m | 69.89 | 70.87 |
| simple facts + BERT | 110.5 m | 72.03 | 73.01 |
| facts pairs + BERT | 110.5 m | 78.77 | 81.43 |

Described above is a model and learning protocol for external knowledge incorporation for the task of pairwise sentence classification. The above is language independent and does not rely on structured knowledge representation. The above can easily be adapted to specific corpus of knowledge but may benefit from large parametric language models for sentence level contextualization. The method of knowledge extraction is generic with respect to knowledge source and can be used with surface realization of structure facts or directly corpus of common-sense knowledge, such as Wikipedia.

Table 4 below includes text of one entry of the augmented training dataset 604. The second to last rows of Table 4 illustrates the answer determined by the answer module 212 based on training using the augmented training dataset 604. The last row of Table 4 illustrates the answer determined by the answer module 212 based on training using the training dataset 608. As illustrated, training based on the augmented training dataset 604 yields the correct answer, while training based on the training dataset 608 yields an incorrect answer.

TABLE 4

A sample which was misclassified by the model trained using the training dataset, but was correctly classified the model trained using the augmented training dataset

| | |
| --- | --- |
| premise (p) | Some of the hair in his beard are turning grey. |
| facts for the premise | You are likely to find hair in someone's head, wool is related to hair, hair is part of your head, Mammals have hair, hair can fall out, beard is related to hair, barba is a translation of beard, kumis is a translation of beard, barbe is a translation of beard, moustache is a translation of beard, squirrel is related to grey, smoke is related to grey, silver is related to grey, gris is a translation of grey |

TABLE 4-continued

A sample which was misclassified by the model trained using the training dataset, but was correctly classified the model trained using the augmented training dataset

| | |
| --- | --- |
| hypothesis (h) | The man has grey hairs in his beard. |
| facts for the hypothesis | boy is related to man, man is related to person, man is related to boy, person is related to man, fellow is related to man, squirrel is related to grey, smoke is related to grey, silver is related to grey, gris is a translation of grey, beard is related to hair, barba is a translation of beard, kumis is a translation of beard, barbe is a translation of beard, moustache is a translation of beard |
| joint facts for both p and h | beard is related to hair, beard is a type of hair, beard is made of hair, man is related to beard |
| correct label | entailment |
| label given by training based on the training dataset | neutral |

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A training system comprising:
    a first training dataset including first entries, wherein each of the first entries includes:
        a first sentence;
        a second sentence; and
        an indicator of a relationship between the first and second sentences;
    a training module configured to:
        generate a second dataset including second entries based on the first entries, respectively, wherein each of the second entries includes:
            the first sentence of one of the first entries;
            the second sentence of the one of the first entries;
            a first surface realization corresponding to first facts regarding the first sentence;
            the indicator of the one of the first entries; and
        train a model using the second dataset and store the model in memory.

2. The training system of claim 1 wherein each of the second entries further includes a second surface realization corresponding to second facts regarding the second sentence.

3. The training system of claim 2 wherein each of the second entries further includes a third surface realization corresponding to third facts for both of the first and second sentences.

4. The training system of claim 3 wherein the training module is configured to generate at least one of the first, second, and third surface realizations using a concept retrieval algorithm.

5. The training system of claim 4 wherein the concept retrieval algorithm includes version 5.5 of the ConceptNet algorithm.

6. The training system of claim 3 wherein the training module is configured to generate the first, second, and third surface realizations using a ConceptNet algorithm.

7. The training system of claim 3 wherein the training module is configured to generate at least one of the first, second, and third surface realizations using a surfaceText algorithm of a ConceptNet algorithm.

8. The training system of claim 3 wherein the training module is configured to:
  extract first nouns and first adjectives in the first sentence;
  determine the first surface realization based on the first nouns and the first adjectives;
  extract second nouns and second adjectives in the second sentence; and
  determine the second surface realization based on the second nouns and the second adjectives.

9. The training system of claim 8 wherein the training module is configured to:
  extract only the first nouns and the first adjectives from the first sentence; and
  extract only the second nouns and the second adjectives from the second sentence.

10. The training system of claim 8 wherein the training module is configured to:
  set the first surface realization based on up to a predetermined number of surface realizations that are most closely associated with the first nouns and adjectives; and
  set the second surface realization based on up to the predetermined number of surface realizations that are most closely associated with the second nouns and adjectives.

11. The training system of claim 1 wherein the indicator is set to a group consisting of:
  a first state indicative of the first sentence being true given the second sentence;
  a second state indicative of the first sentence being false given the second sentence; and
  a third state indicative of the first and second sentences being unrelated.

12. The training system of claim 1 wherein the first training dataset includes the Stanford Natural Language Inference (SNLI) dataset.

13. A system comprising:
  the training system of claim 1; and
  a fact checking module configured to:
    receive a third sentence;
    determine a fourth sentence from a data source based on the third sentence;
    determine a fourth surface realization associated with the third sentence;
    determine a fifth surface realization associated with the fourth sentence; and
    using the model, based on the third sentence, the fourth surface realization, the fourth sentence, and the fifth surface realization, set an indicator to one of a group consisting of:
      a first state indicative of the third sentence being true given the fourth sentence;
      a second state indicative of the third sentence being false given the fourth sentence; and
      a third state indicative of the third and fourth sentences being unrelated.

14. The training system of claim 13 wherein the fact checking module is configured to:
  receive the third sentence from a computing device via a network; and
  transmit the indicator to the computing device via the network.

15. The training system of claim 13 wherein the model includes:
  a first encoder module configured to encode the third sentence;
  a second encoder module configured to encode the fourth surface realization;
  a third encoder module configured to encode the fourth sentence;
  a fourth encoder module configured to encode the fifth surface realization;
  first, second, third, and fourth context modules configured to contextualize outputs of the first, second, third, and fourth encoder modules, respectively;
  a first concatenation module configured to concatenate outputs of the first and second context modules;
  a second concatenation module configured to concatenate outputs of the third and fourth context modules;
  a first maxpool module configured to perform a maxpool operation on an output of the first concatenation module;
  a second maxpool module configured to perform a maxpool operation on an output of the second concatenation module;
  a third concatenation module configured to concatenate outputs of the first and second maxpool modules;
  a linearization module configured to linearize an output of the third concatenation module; and
  an output module configured to set the indicator based on an output of the linearization module.

16. A fact checking system comprising:
  a parsing module configured to parse a first sentence to be checked for factual accuracy from a query received from a computing device via a network;
  an answer module configured to:
    select a second sentence from a data source based on the first sentence;
    determine a first surface realization corresponding to first facts associated with the first sentence;
    determine a second surface realization corresponding to second facts associated with the second sentence;
    using a trained model, based on the first sentence, the first surface realization, the second sentence, and the second surface realization, set an indicator to one of a group consisting of:
      a first state indicative of the first sentence being true given the second sentence;
      a second state indicative of the first sentence being false given the second sentence; and
      a third state indicative of the first and second sentences being unrelated; and
    transmit the indicator to the computing device via the network.

17. The fact checking system of claim 16 wherein the answer module is configured to determine the first and second surface realizations using a ConceptNet algorithm.

18. The fact checking system of claim 16 wherein the answer module is configured to determine the first and second surface realizations using a surfaceText algorithm of a ConceptNet algorithm.

19. The fact checking system of claim 16 wherein the trained model includes:
  a first encoder module configured to encode the first sentence;
  a second encoder module configured to encode the first surface representation;
  a third encoder module configured to encode the second sentence;
  a fourth encoder module configured to encode the second surface representation;

first, second, third, and fourth context modules configured to contextualize outputs of the first, second, third, and fourth encoder modules, respectively;
a first concatenation module configured to concatenate outputs of the first and second context modules;
a second concatenation module configured to concatenate outputs of the third and fourth context modules;
a first maxpool module configured to perform a maxpool operation on an output of the first concatenation module;
a second maxpool module configured to perform a maxpool operation on an output of the second concatenation module;
a third concatenation module configured to concatenate outputs of the first and second maxpool modules;
a linearization module configured to linearize an output of the third concatenation module; and
an output module configured to set the indicator based on an output of the linearization module.

20. A training method comprising:
storing a first training dataset including first entries, wherein each of the first entries includes:
a first sentence;
a second sentence; and
an indicator of a relationship between the first and second sentences;
generating a second dataset including second entries based on the first entries, respectively, wherein each of the second entries includes:
the first sentence of one of the first entries;
the second sentence of the one of the first entries;
a first surface realization corresponding to first facts regarding the first sentence; and
the indicator of the one of the first entries;
training a model using the second dataset; and
storing the model in memory.

21. A training system comprising:
a first training dataset including first entries, wherein each of the first entries includes:
a first sentence;
a second sentence; and
an indicator of a relationship between the first and second sentences;
a means for:
generating a second dataset including second entries based on the first entries, respectively, wherein each of the second entries includes:
the first sentence of one of the first entries;
the second sentence of the one of the first entries;
a first surface realization corresponding to first facts regarding the first sentence;
the indicator of the one of the first entries; and
training a model using the second dataset and storing the model in memory.

* * * * *